Patented June 23, 1936

2,045,226

UNITED STATES PATENT OFFICE 2,045,226

PROCESS FOR EXTRACTING METALS FROM ORES

Carl Goetz, Berlin, Germany

No Drawing. Application March 27, 1933, Serial No. 663,100. In Germany April 1, 1932

10 Claims. (Cl. 75—6)

This invention comprises a process which is a development of my process for obtaining metals from bituminous ores by heat treatment in the absence of air and of my process for obtaining metals from sulphidic ores by heat treatment in presence of solid, liquid or gaseous hydrocarbons in absence of air. By bituminous ores are meant ores which, apart from the ore content, can be spoken of as bituminous rock, more particularly as bituminous shale, e. g. Mansfeld copper shale, which contains 10–17% of bitumen hydrocarbons.

In the course of work carried out to bring these processes to perfection it has been found that with certain presuppositions the metals can also be liberated from their compounds without the action of the gases which are evolved from bitumen, or gases of other kinds, if the ores are subjected to a heat treatment in an inert gas with exclusion of air. The metals can be liberated from sulphidic and arsenical ores in the metallic form and conglomerated to coarser particles capable of being readily further worked up, if a definite quantity of iron is present in the ore, either in the form of a sulphur-copper-iron mineral or as pyrites or pyrrhotite, or even as iron oxides or metallic iron. For this purpose the iron-containing ore in the form of small to fine granules is subjected to several hours' heat treatmeant with exclusion of air in an inert gas or an inert gas mixed with a combustible gas such as hydrocarbons, carbon monoxide and the like.

It has been found that besides streams of inert gas, alone or mixed with reducing gas, any other non-oxidizing gas can be used for carrying out the process. When using such gases also the presence of iron oxides, metallic iron or substances like carbonate of iron and hydroxide of iron which form oxide of iron when heated acts preeminently with a desulphurizing effect. Among others, carbon monoxide, hydrogen, illuminating gas, water gas or mixtures of such gases, or reducing gases mixed with steam have proved to be suitable reducing gases. By "illuminating gas" is meant the gas obtained on distilling mineral coal; the particular gas used by the applicant in his experiments had the following compositions: 3–4% $CO_2$; 0.2% $O_2$; 17–18% CO; 48–50% $H_2$; 16–18% $CH_4$. It is true the reducing gases also exert a desulphurizing effect in the case of copper glance without any iron being present, but then considerably larger quantities of gas and longer reaction times or substantially higher temperatures are necessary. For example, from finely ground copper glance which has been exposed for two hours at 600° to a steam-illuminating gas stream flowing at a rate of 12 litres of gas per hour and 125 cc. of steam per hour, only 0.9% of metallic copper is obtained whilst when using double the quantities of gas and steam only 3.7% of copper are obtained in the same time and at the same temperature.

If the same quantity of copper glance is mixed with iron oxides in the ratio of 1:1, then other conditions being the same, after 2 hours' treatment at 600° in a stream of illuminating gas and steam of 12 litres of gas per hour and 125 cc. of water per hour 65.2% of metallic copper are produced. Since the reducing gases are only very slightly used in this process, they can be employed repeatedly, if necessary being each time purified from the sulphur dioxide or sulphuretted hydrogen, the content of which latter corresponds to only a few percent of the original sulphur content of the ore. The best results are obtained at temperatures lying round about 600° and by a further treatment at temperatures rising to about 800°, but the reactions already commence at lower temperatures. The temperatures must not be carried as high as the melting points of the minerals coming into question or of the eutectic mixtures present. It has been proposed to dissociate antimony sulphide in a closed retort at temperatures of 1500°, sulphur vapours escaping and the separated antimony flowing back into the dissociation chamber. It is also known to decompose pyrites and other sulphidic ores in different gases into their components by heating to fusion temperatures of 1500 to 2000°. Further, it is known to fuse partially roasted copper matte or copper ore with silicic acid and to obtain an enriched copper regulus, iron exerting a desulphurizing effect on lead sulphide and a double silicate of lead and iron then being formed. The present invention is a substantial improvement over these known processes since all the latter operate with substantially higher temperatures and employ liquid furnace charges.

The process is suitable for every kind of sulphide ore, more particularly for sulphidic copper ores, which in addition also contain noble metals such as gold and silver.

Further, the treatment time is of importance. It has been found that if the treatment time is too long the equilibrium is shifted into the opposite direction and re-formation of copper sulphide takes place. The liberated elementary metals can be worked up without difficulty either by gravitational methods or by flotation, or by chemical methods such as lixiviation and so forth. More particularly the particles of ore, subdivided in a state of colloidal fineness, may be conglomerated to such coarse particles that they offer no further difficulty to the working up operations. It is particularly noteworthy that the granule size can be regulated according to the time of treatment in such a way that coarser particles are formed with longer treatment times or higher temperatures. This fact is of particular importance for the recovery of noble metals from Boliden ores which hitherto could not be worked up at all. Since the metals to be obtained are present in the metallic form throughout the heat-treated material they can be worked up without difficulty.

All the temperatures given in this specification are to be understood as being on the centigrade scale.

What I claim is:

1. A process for obtaining non-ferrous metal from iron-containing ores thereof of sulphidic or arsenical nature, consisting in heating the unroasted ore in a stream of non-oxidizing gas at an elevated temperature which is substantially below the melting point of the ore, whereby the sulphur and arsenic combine with the iron which is present and the non-ferrous metal is liberated in its elementary state and conglomerated to coarse particles.

2. A process for obtaining non-ferrous metal from iron-containing ores thereof of sulphidic or arsenical nature, consisting in heating the unroasted ore in a stream of reducing gas at an elevated temperature which is substantially below the melting point of the ore, whereby the sulphur and arsenic combine with the iron which is present and the non-ferrous metal is liberated in its elementary state and conglomerated to coarse particles.

3. A process for obtaining non-ferrous metal from iron-containing ores thereof of sulphidic or arsenical nature, consisting in heating the unroasted ore in a stream of reducing gas containing carbon monoxide at an elevated temperature which is substantially below the melting point of the ore, whereby the sulphur and arsenic combine with the iron which is present and the non-ferrous metal is liberated in its elementary state and conglomerated to coarse particles.

4. A process for obtaining non-ferrous metal from iron-containing ores thereof of sulphidic or arsenical nature, consisting in heating the unroasted ore in a stream of reducing gas containing coal distillation gas at an elevated temperature which is substantially below the melting point of the ore, whereby the sulphur and arsenic combine with the iron which is present and the non-ferrous metal is liberated in its elementary state and conglomerated to coarse particles.

5. A process for obtaining non-ferrous metal from iron-containing ores thereof of sulphidic or arsenical nature, consisting in heating the unroasted ore in a stream of reducing gas containing hydrogen at an elevated temperature which is substantially below the melting point of the ore, whereby the sulphur and arsenic combine with the iron which is present and the non-ferrous metal is liberated in its elementary state and conglomerated to coarse particles.

6. A process for obtaining non-ferrous metal from iron-containing ores thereof of sulphidic or arsenical nature, consisting in heating the unroasted ore in a stream of inert gas at an elevated temperature which is substantially below the melting point of the ore, whereby the sulphur and arsenic combine with the iron which is present and the non-ferrous metal is liberated in its elementary state and conglomerated to coarse particles.

7. A process for obtaining non-ferrous metal from iron-containing ores thereof of sulphidic or arsenical nature, consisting in heating the unroasted ore in a stream of nitrogen at an elevated temperature which is substantially below the melting point of the ore, whereby the sulphur and arsenic combine with the iron which is present and the non-ferrous metal is liberated in its elementary state and conglomerated to coarse particles.

8. A process for obtaining non-ferrous metal from iron-containing ores thereof of sulphidic or arsenical nature, consisting in heating the unroasted ore in a stream of inert gas mixed with reducing gas at an elevated temperature which is substantially below the melting point of the ore, whereby the sulphur and arsenic combine with the iron which is present and the non-ferrous metal is liberated in its elementary state and conglomerated to coarse particles.

9. A process for obtaining non-ferrous metal from iron-containing ores thereof of sulphidic or arsenical nature, consisting in heating the unroasted ore in a stream of inert gas mixed with carbonaceous reducing gas at an elevated temperature which is substantially below the melting point of the ore, whereby the sulphur and arsenic combine with the iron which is present and the non-ferrous metal is liberated in its elementary state and conglomerated to coarse particles.

10. A process for obtaining non-ferrous metal from iron-containing ores thereof of sulphidic or arsenical nature, consisting in heating the unroasted ore in a stream of inert gas mixed with illuminating gas and steam at an elevated temperature which is substantially below the melting point of the ore, whereby the sulphur and arsenic combine with the iron which is present and the non-ferrous metal is liberated in its elementary state and conglomerated to coarse particles.

CARL GOETZ.